United States Patent [19]

Mastumoto

[11] Patent Number: 5,755,203
[45] Date of Patent: May 26, 1998

[54] CHARGE-FORMING SYSTEM FOR GASEOUS FUELED ENGINE

[75] Inventor: Hiromitsu Mastumoto, Iwata, Japan

[73] Assignee: Yamaha Hatsudoki Kabushiki Kaisha, Iwata, Japan

[21] Appl. No.: 401,348

[22] Filed: Mar. 9, 1995

[30] Foreign Application Priority Data

Mar. 14, 1994 [JP] Japan .................... 6-068172

[51] Int. Cl.⁶ ........................................ F02D 9/08
[52] U.S. Cl. ................ 123/403; 123/184.32; 123/527
[58] Field of Search .................... 123/527, 54.4, 123/54.6, 184.31, 184.32, 184.34, 403

[56] References Cited

U.S. PATENT DOCUMENTS

| | | | |
|---|---|---|---|
| 1,954,968 | 4/1934 | Waters | 123/527 |
| 2,016,695 | 10/1935 | Timian | 123/54.6 |
| 2,475,086 | 7/1949 | Ensign | 123/527 |
| 3,111,120 | 11/1963 | Cornell | 123/54.4 |
| 3,646,924 | 3/1972 | Newkirk et al. | |
| 3,996,908 | 12/1976 | Brown, III et al. | |
| 3,996,909 | 12/1976 | Fischer | |
| 4,020,813 | 5/1977 | Hattori et al. | |
| 4,089,311 | 5/1978 | Brettschbeider et al. | |
| 4,168,685 | 9/1979 | Little et al. | |
| 4,216,757 | 8/1980 | Romann | |
| 4,263,883 | 4/1981 | Treible | |
| 4,285,700 | 8/1981 | Fox | |
| 4,327,689 | 5/1982 | Rachel | |
| 4,347,824 | 9/1982 | Pierson | |
| 4,359,024 | 11/1982 | Lootens et al. | 123/403 |
| 4,364,364 | 12/1982 | Subramaniam | |
| 4,369,749 | 1/1983 | Sugi | |
| 4,369,751 | 1/1983 | Batchelor et al. | |

(List continued on next page.)

FOREIGN PATENT DOCUMENTS

| | | | |
|---|---|---|---|
| A0346989 | 6/1989 | European Pat. Off. | |
| 3044744 | 3/1982 | Germany | |
| A3321424 | 6/1983 | Germany | |
| 3205935 | 9/1983 | Germany | |
| 57-23101 | 5/1982 | Japan | |
| 58-217747 | 12/1983 | Japan | |
| 59-176444 | 5/1984 | Japan | |
| 60-32031 | 7/1985 | Japan | |
| 62-131908 | 6/1987 | Japan | |
| 192505 | 4/1989 | Japan | |
| 2139307 | 5/1990 | Japan | |
| 2191807 | 7/1990 | Japan | |
| 3249363 | 11/1991 | Japan | 123/527 |
| 5164002 | 6/1993 | Japan | 123/527 |
| A1327513 | 4/1971 | United Kingdom | |
| 2096243 | 10/1982 | United Kingdom | |
| 9404813 | 3/1994 | WIPO | |

OTHER PUBLICATIONS

European Search Report dated Jul. 14, 1995.
Patent Abstracts of Japan, vol. 004, No. 120 (M–028) 26-Aug. 1980 & JP–A–55,078146 (Automob Antipollut & Saf Res Center) 12 Jun. 1980.
European Search Report dated Feb. 10, 1993.

Primary Examiner—Erick R. Solis
Attorney, Agent, or Firm—Knobbe, Martens, Olson & Bear LLP

[57] ABSTRACT

A number of embodiments of gaseous fueled internal combustion engines in which the charge former has no throttle valve in it. A separate throttle body is provided downstream of the charge former in which the flow controlling throttle valve is positioned so as to protect the charge former from deposits being formed on its metering arrangements. In some embodiments the throttle body is disposed at an angle to the air passage through the charge former to provide further protection. By separating the charge former from the throttle body, the engine height can be kept low because the charge former can be positioned at any desired location. Both in-line and V-type arrangements are provided and with the V-type arrangement the charge former is disposed externally of the valley between the cylinder banks so as to further maintain a low hood line.

13 Claims, 12 Drawing Sheets

U.S. PATENT DOCUMENTS

| | | |
|---|---|---|
| 4,381,753 | 5/1983 | Yuzawa et al. . |
| 4,385,613 | 5/1983 | Yoshida et al. . |
| 4,404,947 | 9/1983 | Swanson . |
| 4,413,607 | 11/1983 | Batchelor et al. . |
| 4,457,279 | 7/1984 | Teramura et al. . |
| 4,492,204 | 1/1985 | Bertsch et al. . |
| 4,492,205 | 1/1985 | Jundt et al. . |
| 4,517,134 | 5/1985 | Nakamura et al. . |
| 4,528,957 | 7/1985 | Jundt et al. . |
| 4,541,397 | 9/1985 | Young . |
| 4,545,350 | 10/1985 | Nakamura et al. . |
| 4,554,896 | 11/1985 | Sougawa . |
| 4,572,149 | 2/1986 | Hasegawa et al. . |
| 4,589,397 | 5/1986 | Stankewitsch . |
| 4,606,319 | 8/1986 | Silva . |
| 4,628,883 | 12/1986 | Kataoka . |
| 4,638,783 | 1/1987 | Snyder . |
| 4,686,951 | 8/1987 | Snyder . |
| 4,696,278 | 9/1987 | Ito et al. . |
| 4,699,630 | 10/1987 | Lee et al. . |
| 4,742,808 | 5/1988 | Blumel et al. . |
| 4,774,909 | 10/1988 | Dolderer . |
| 4,813,390 | 3/1989 | Bennett . |
| 4,813,394 | 3/1989 | St. Clair . |
| 4,829,957 | 5/1989 | Garretson et al. . |
| 4,834,050 | 5/1989 | Uranishi et al. . |
| 4,843,558 | 6/1989 | Bergmann et al. . |
| 4,858,583 | 8/1989 | Sonntag . |
| 4,864,991 | 9/1989 | Snyder . |
| 4,870,933 | 10/1989 | Mizuno . |
| 4,915,081 | 4/1990 | Fujimoto et al. . |
| 4,938,199 | 7/1990 | Sato et al. . |
| 4,953,516 | 9/1990 | van der Weide et al. . |
| 4,970,858 | 11/1990 | Matsuoka . |
| 5,058,556 | 10/1991 | Fukuma et al. . |
| 5,076,245 | 12/1991 | Jones . |
| 5,101,799 | 4/1992 | Davis et al. . |
| 5,115,782 | 5/1992 | Klinke et al. . |
| 5,150,673 | 9/1992 | Hoshiba et al. . |
| 5,150,690 | 9/1992 | Carter et al. . |
| 5,172,678 | 12/1992 | Suzuki . |
| 5,207,058 | 5/1993 | Sasaki et al. . |
| 5,224,347 | 7/1993 | Yakabe et al. . |
| 5,251,602 | 10/1993 | Kurihara ................. 123/527 |
| 5,293,741 | 3/1994 | Kashiyama et al. . |
| 5,357,935 | 10/1994 | Oxley et al. ............. 123/527 |

5,755,203

1

CHARGE-FORMING SYSTEM FOR GASEOUS FUELED ENGINE

BACKGROUND OF THE INVENTION

This invention relates to a charge-forming system for gaseous fueled engines and more particularly to a charge forming system of this type that will maintain good running for long time periods without servicing.

The advantage of using gaseous fuel for operating internal combustion engines rather than the more common liquid fuel are readily acknowledged. Besides conserving natural resources, gaseous fuels have been found to offer the possibility of better emission control, longer engine life, and better exhaust emission control.

Conventionally, gaseous fuel engines have employed a charge-forming system that receives the gaseous fuel from the source. The gaseous fuel is generally referred to as LPG, but may actually constitute any of a plurality of gaseous fuels such as LPG, LNG, or CNG (liquid petroleum gas, liquified natural gas, or natural gas). These gases are generally stored at high pressure and frequently at high enough pressure that the gas becomes converted to a liquid. The gaseous fuel is then supplied to a pressure regulator which regulates the pressure and delivers the gas to the charge former for metering and mixing with air for delivery to the engine.

Although these systems are very effective, their performance tends to deteriorate with age. One reason for this is that the mixing orifices are relatively small, and the presence of hydrocarbons in the induction passage may cause the formation of particles that can plug the orifices and flow passages. The hydrocarbons may be present because of the fact that both crankcase ventilating gases and exhaust gases are frequently introduced into the induction system for subsequent treatment in the cylinders when combustion occurs.

When the systems operate with feedback controls, as have been proposed, even though the system attempts to maintain uniform performance, the performance still can deteriorate for the reasons aforenoted.

It is, therefore, a principal object of this invention to provide a charge-forming system for a gaseous fuel engine wherein the charge former is protected from possible contamination by contaminants.

Although this type of fuel has been utilized with charge formers having fixed-size venturis, it has been acknowledged that performance can be improved by using a so-called variable venturi or air-valve type of carburetor, and such an arrangement is shown and disclosed in U.S. Pat. No. 5,337,772, issued Aug. 16, 1994, and assigned to the assignee hereof. This type of charge-forming device does give better performance, but regardless of the charge former employed, it has been the practice to provide the flow-controlling throttle valve in the body of the charge former. As a result of this, the hydrocarbons can easily pass back to the discharge circuit or circuits of the charge former and cause the aforenoted problems.

It is, therefore, a still further object of this invention to provide an improved charge-forming system for a gaseous fueled engine wherein the charge former is separated from and protected by a throttle body assembly that is positioned downstream of the mixing circuits of the carburetor and independently of them.

The previously proposed types of charge formers embodying both the fuel mixing circuits and the throttle body also provide relatively large assemblies. In addition, it is generally the practice to have an in-line flow arrangement through the charge former and its throttle body, and this causes the height of the charge former to become excessive. This results in the necessity of providing increased hood heights when applied to automobiles. This compromises not only the shape of the associated vehicle, but also reduces the options for improving the wind resistance in the vehicle.

It is, therefore, a still further object of this invention to provide an improved charge former and throttle control for an engine running on gaseous fuel wherein the components may be located separately from each other to maintain the desired hood line.

SUMMARY OF THE INVENTION

A first feature of the invention is adapted to be embodied in a charge-forming system for a gaseous fueled internal combustion engine comprised of a source of gaseous fuel stored under pressure. A charge former has an air passage through which atmospheric air passes. Fuel metering means in the charge former receive fuel from the source of gaseous fuel, meter the fuel and mix it with the air flowing through the air passage. A throttle body is provided which is separate from the charge former and in the flow path therefrom for receiving the air fuel charge and delivering it to an intake port of the engine. A throttle valve is provided in the throttle body for controlling the speed of the associated engine.

Another feature of the invention is also adapted to be embodied in a charge-forming system for a gaseous fueled internal combustion engine and which is comprised of a source of gaseous fuel stored under pressure. The charge former has an air passage through which the atmospheric air passes in a first flow direction. Fuel metering means in the charge former receive fuel from the source of gaseous fuel, meter the fuel and mix it with the air flowing through the air passage. The charge former air passage communicates with a further air passage that delivers the air and fuel charge to an intake port of the engine. This further passage has a flow path that is disposed at a substantial angle to the first flow path through the charge former air passage so as to provide an obstruction to reverse flow from the engine to the charge former.

3

Figure 6:
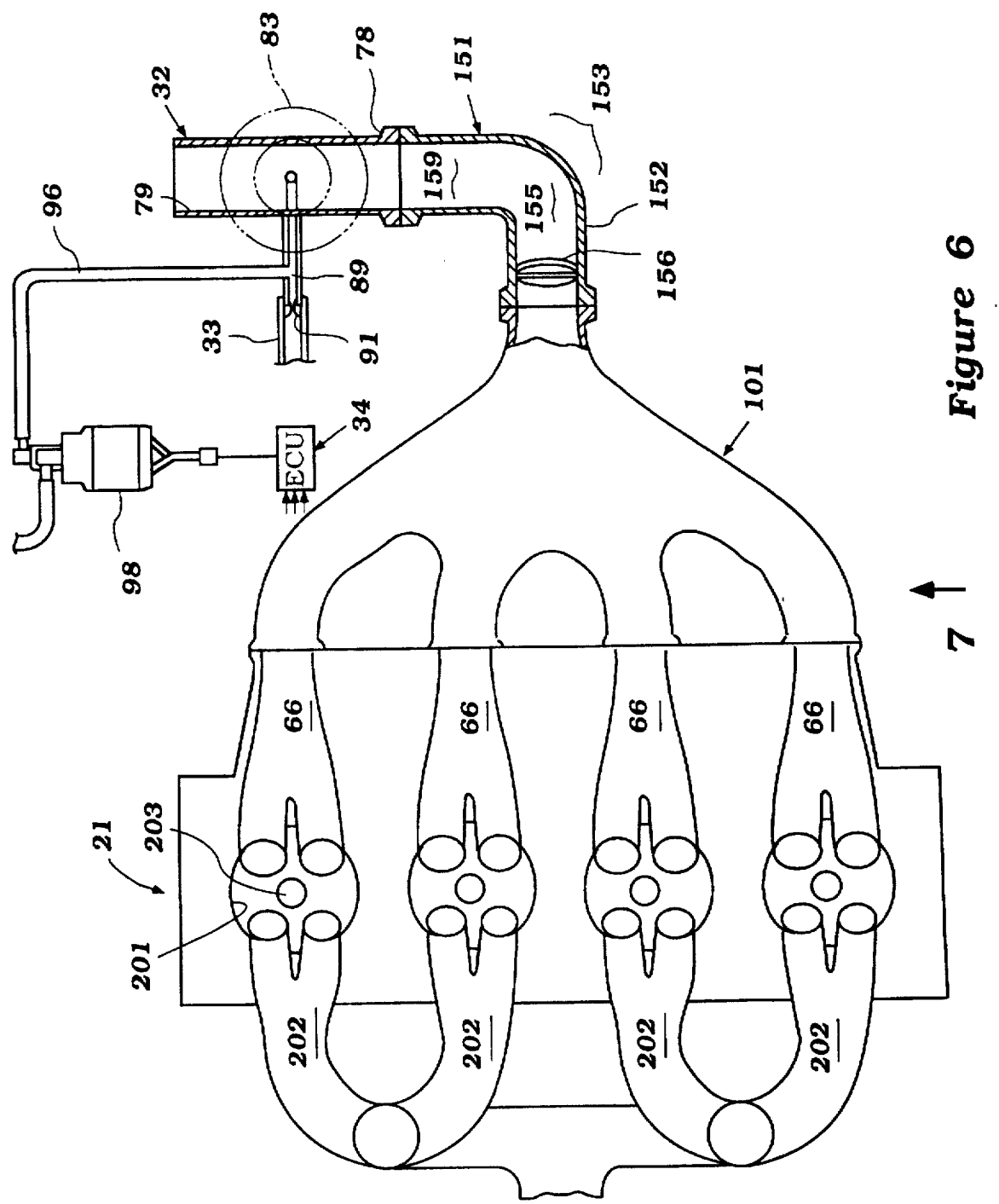
FIG. 6 is a top plan view of an engine constructed in accordance with another embodiment of the invention, with certain portions shown schematically and with other portions being shown in cross section.
Figure 8:
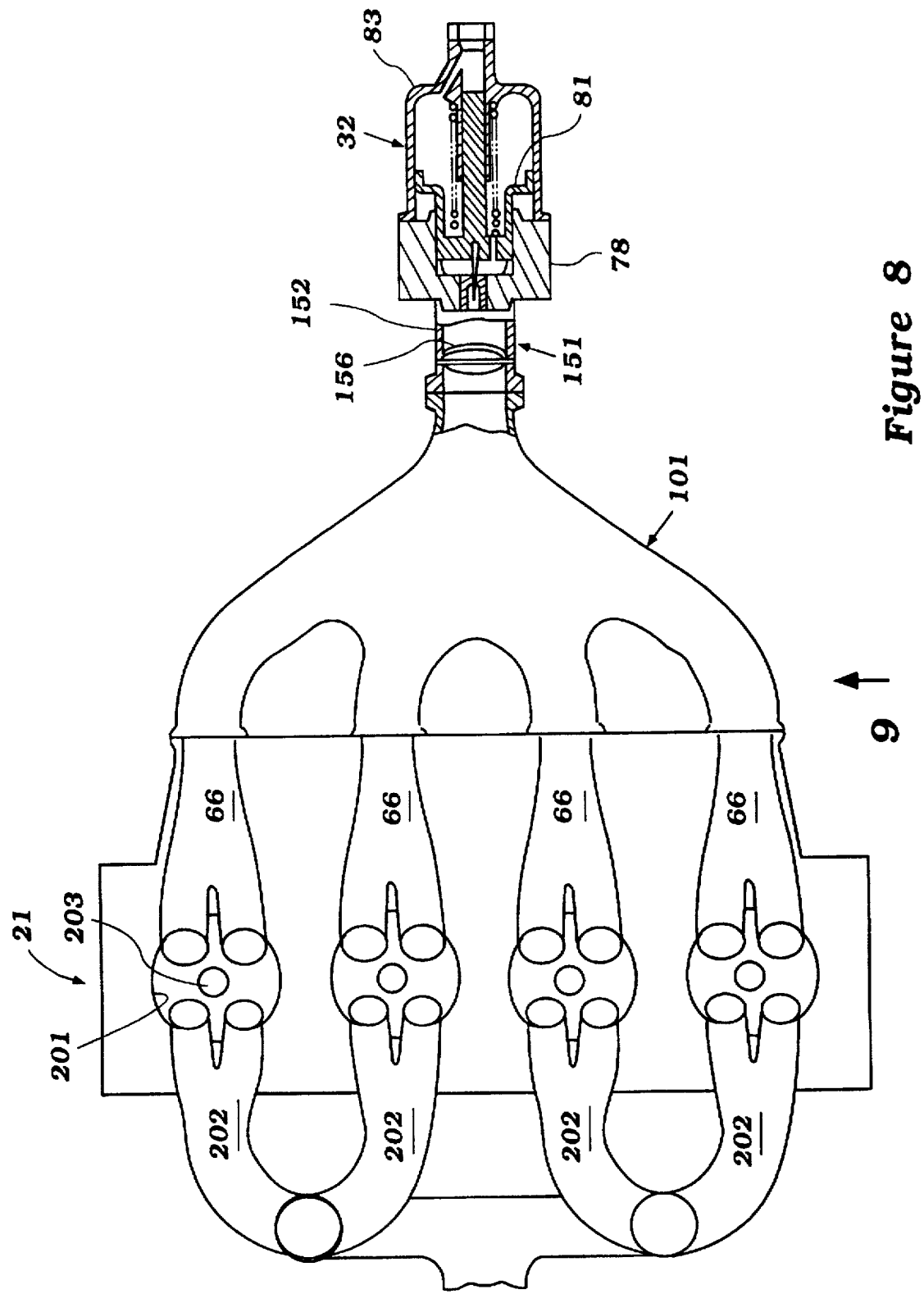

FIG. 8 is a view, in part similar to FIG. 6, and shows yet another embodiment of the invention.

Figure 3:
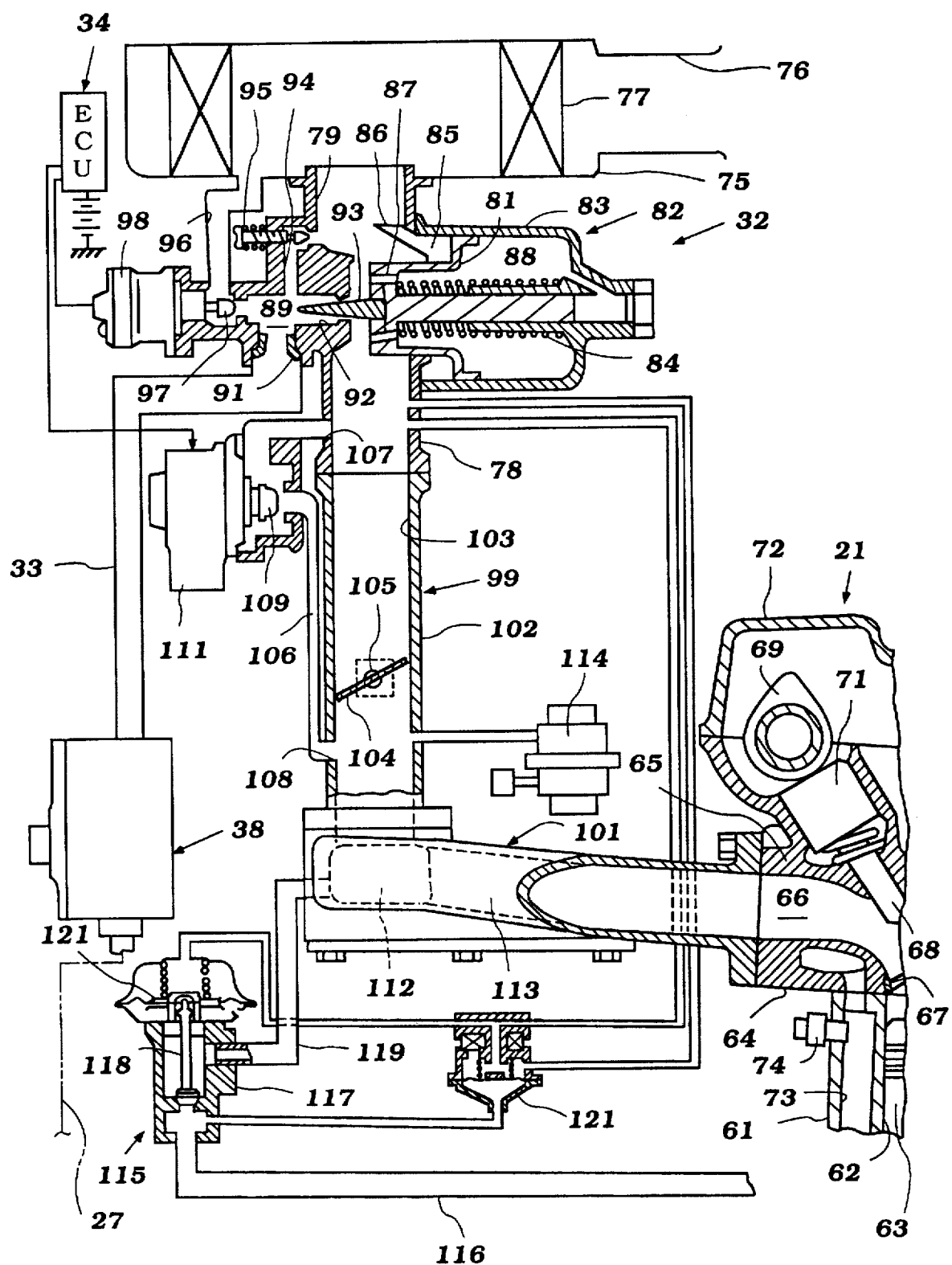
FIG. 3 is an enlarged cross-sectional view taken through the induction system for the engine and shows certain of the components associated with the charge-forming system schematically.
Figure 4:
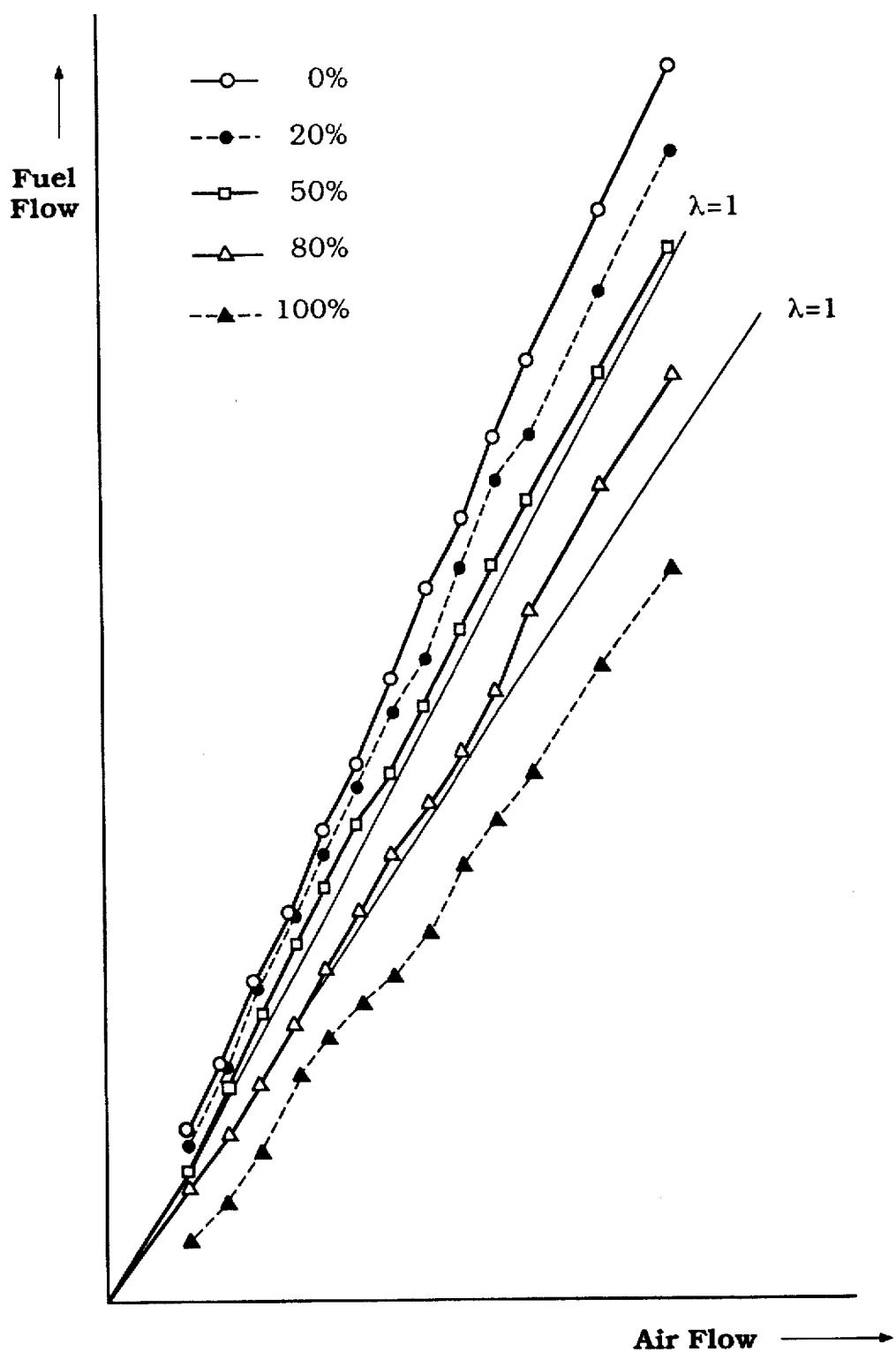
FIG. 4 is a graphical view showing the amount of fuel and air flowing under varying conditions to maintain a stoichiometric mixture with different types of gaseous fuels.
Figure 5:
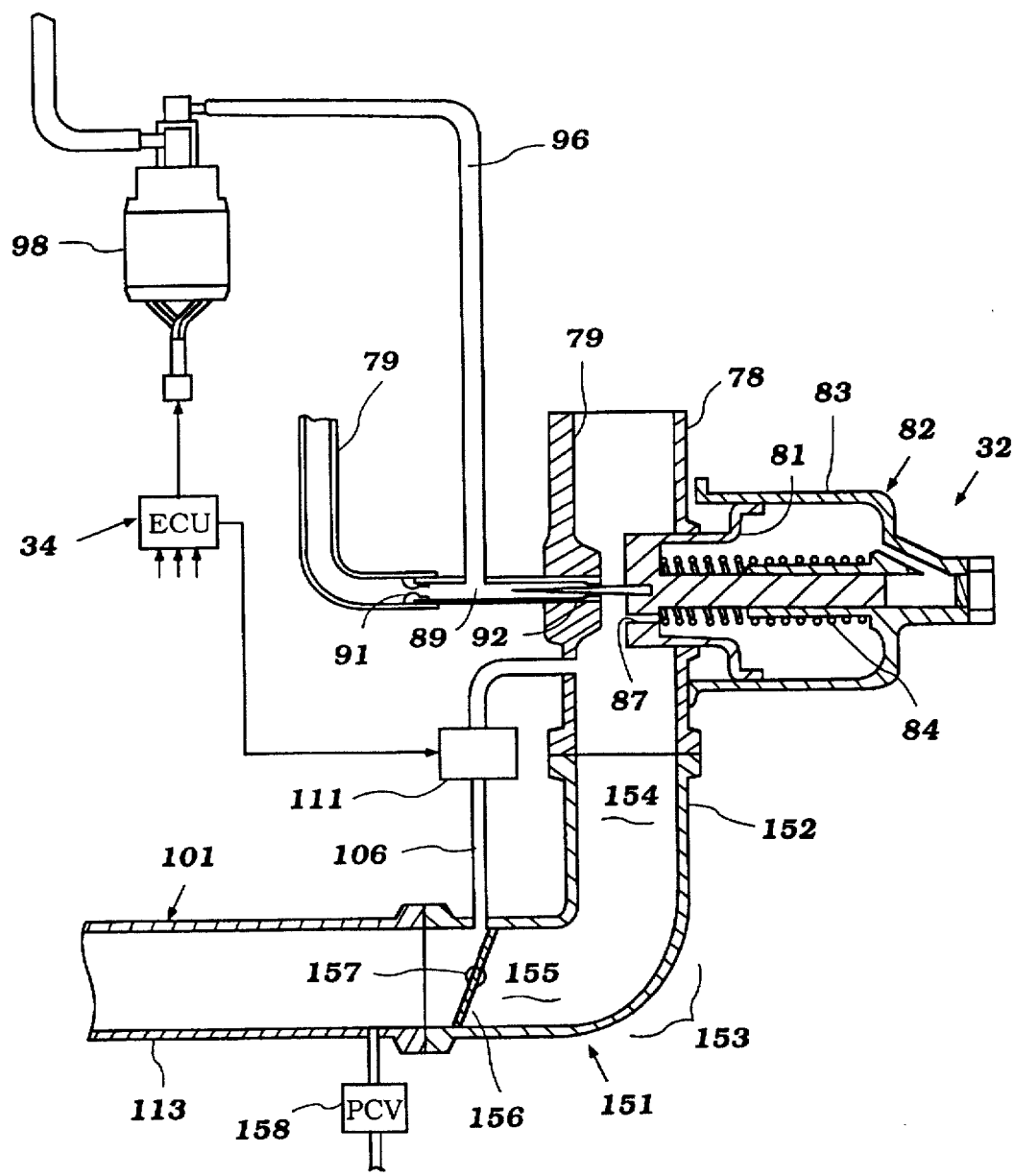
FIG. 5 is a view, in part similar to FIG. 3, and shows another embodiment of the invention, with certain components shown schematically.
Figure 7:
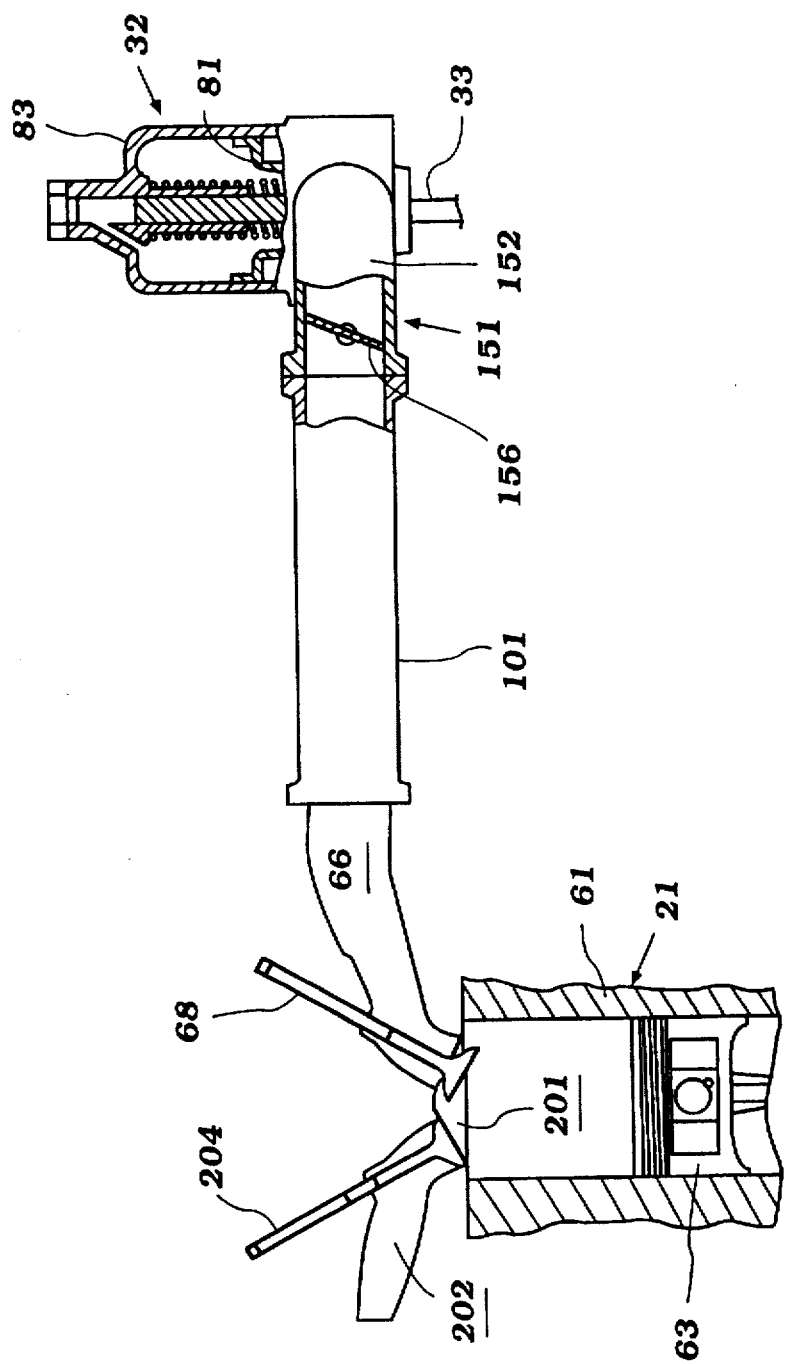
FIG. 7 is a view taken generally in the direction of the arrow 7 in FIG. 6, with portions broken away and shown in section.
Figure 9:
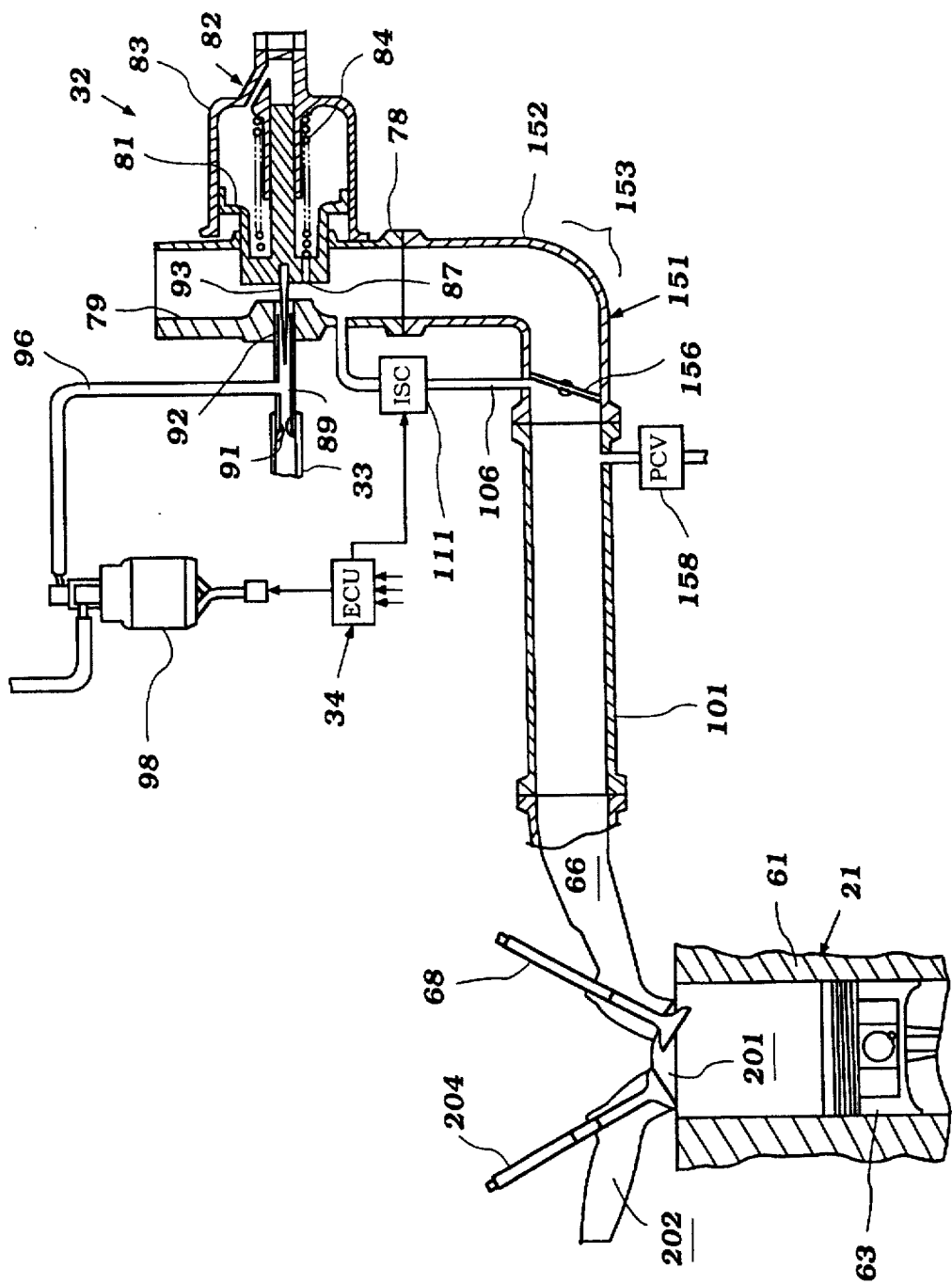

FIG. 9 is a cross-sectional view taken generally in the direction of the arrow 9 in FIG. 8 and is in part similar to FIGS. 3, 5, and 7.

Figure 10:
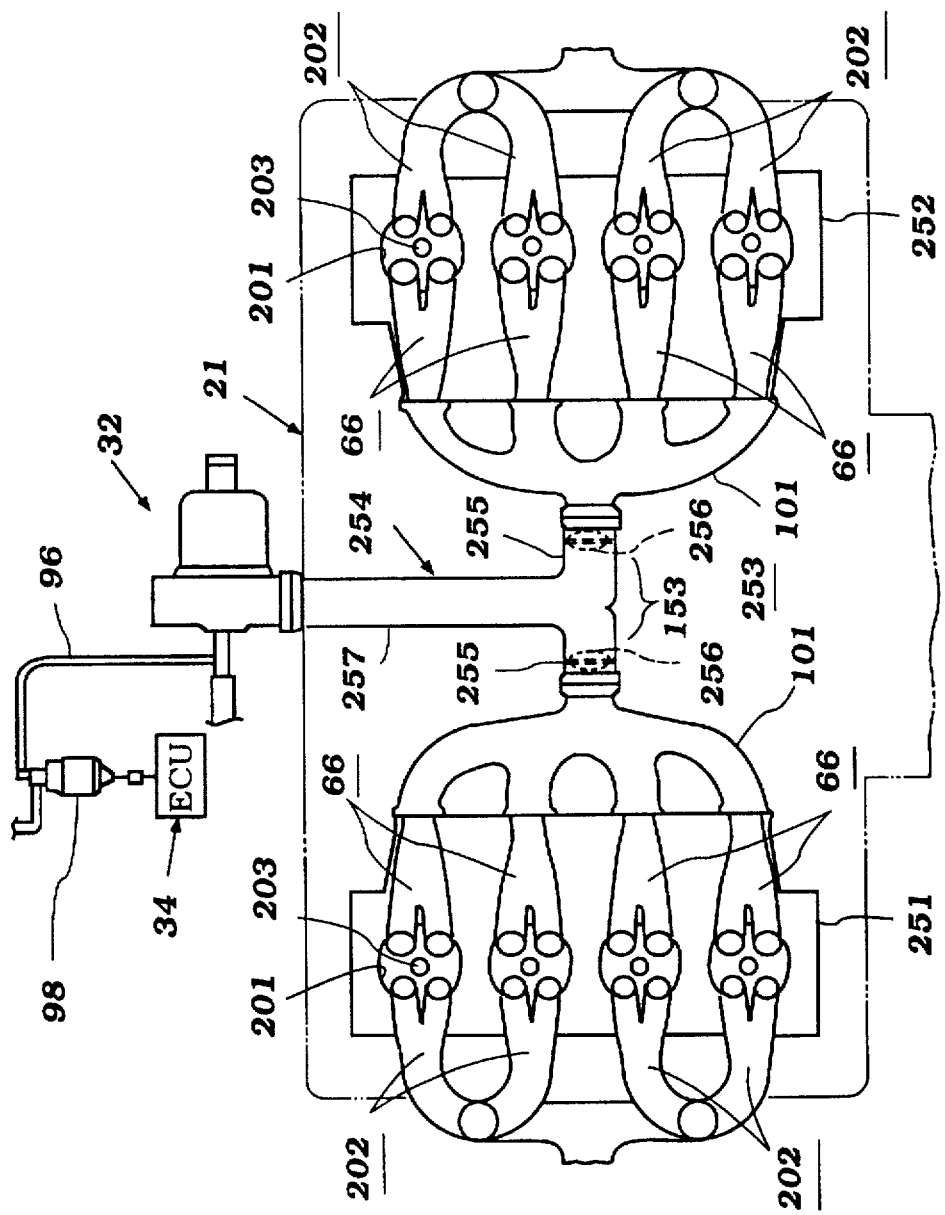

FIG. 10 is a partial top plan view, in part similar to FIGS. 6 and 8, and shows another embodiment of the invention particularly adapted for use with a V-type engine.

Figure 11:
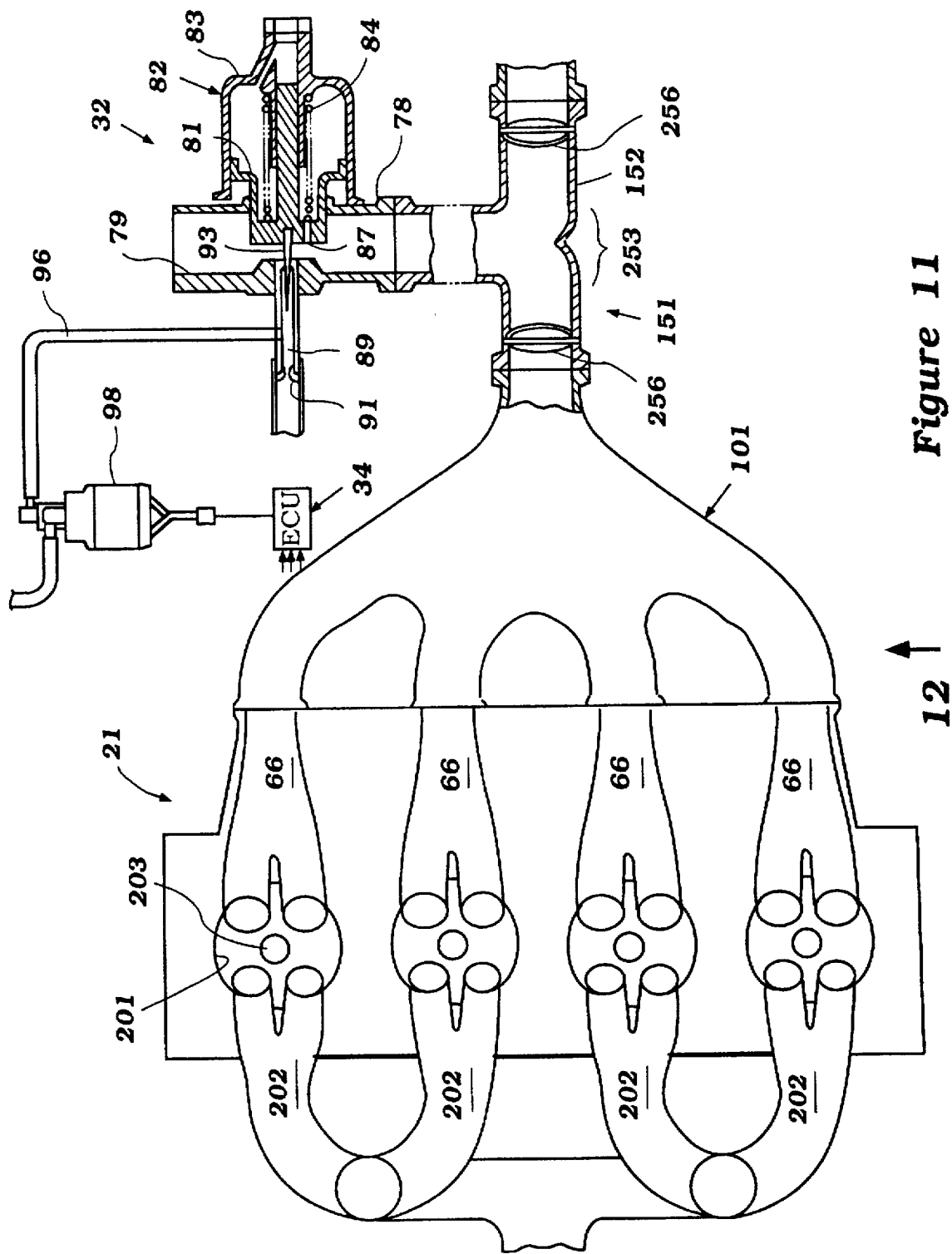

FIG. 11 is a top plan view, in part similar to FIGS. 6, 8, and 10, and shows a further embodiment of the invention.

Figure 12:
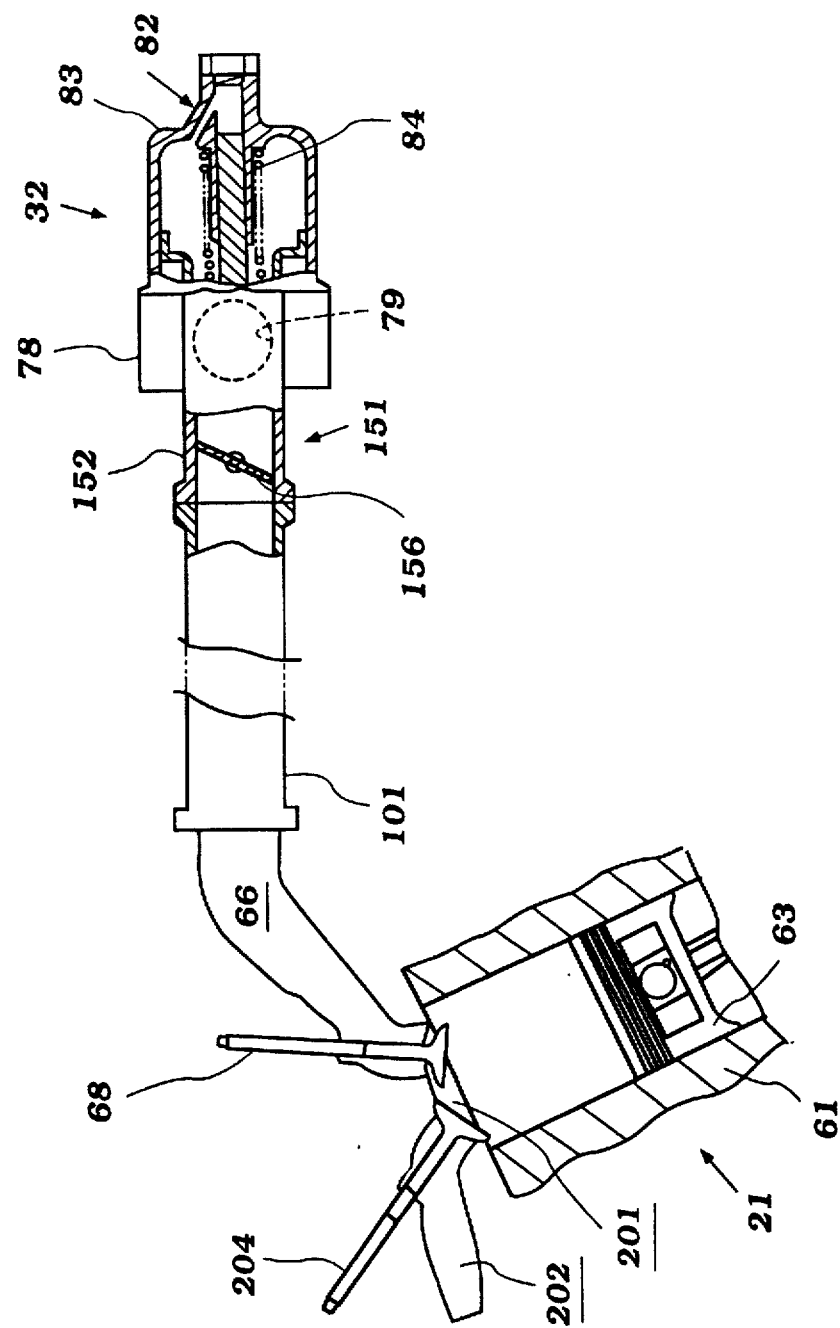

FIG. 12 is a cross-sectional view taken in the direction of the arrow 12 in FIG. 11 and is in part similar to FIGS. 3, 5, 7, and 9.

DETAILED DESCRIPTION OF THE PREFERRED EMBODIMENTS OF THE INVENTION

Figure 1:
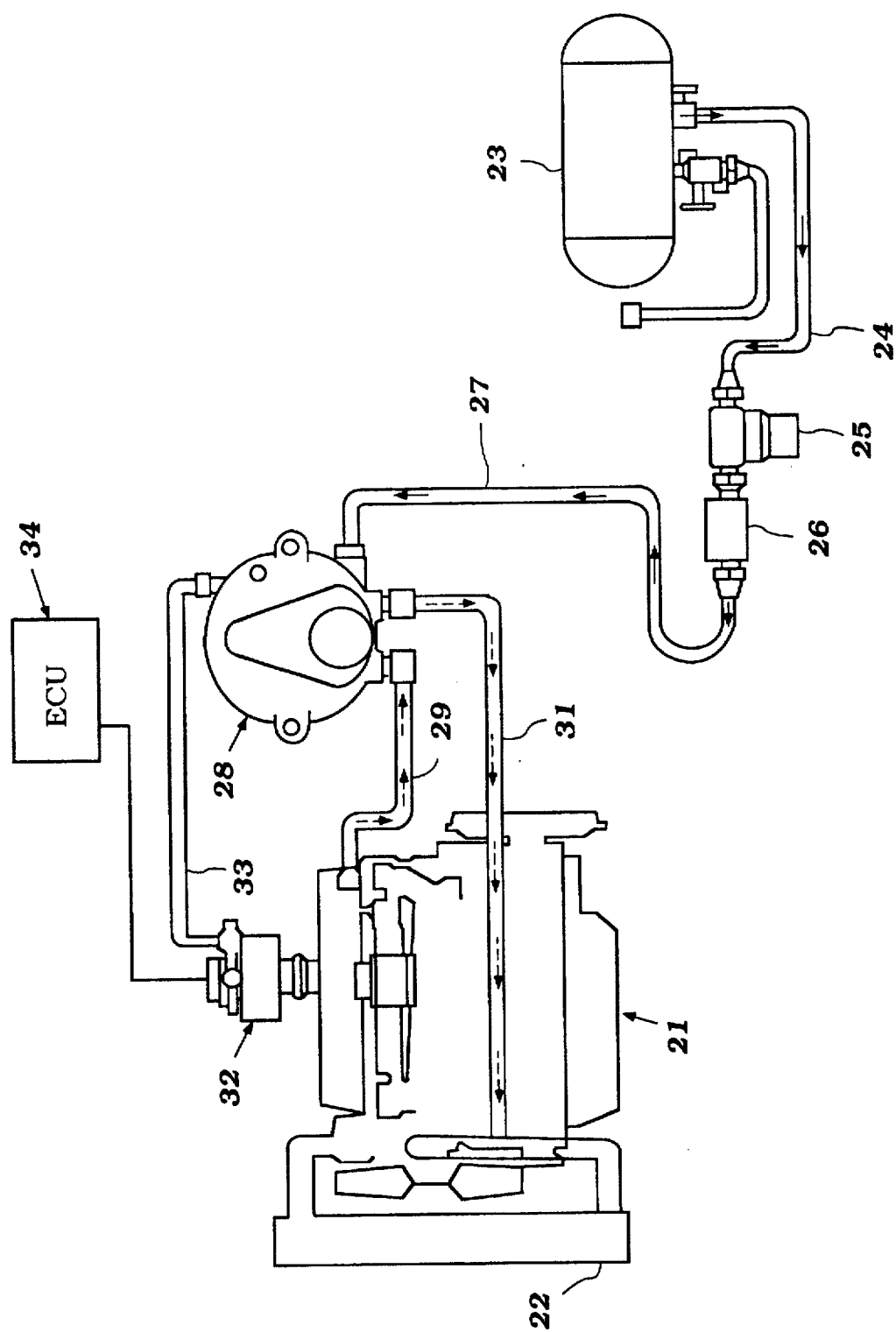
FIG. 1 is a side elevational view of an automotive engine and certain auxiliaries operating on a gaseous fuel through a system constructed in accordance with a first embodiment of the invention.

Referring first to the embodiment of FIGS. 1-4 and initially to FIG. 1, an automotive-type internal combustion engine constructed in accordance with this embodiment of the invention is identified generally by the reference numeral 21. Since the invention deals primarily with the charge-forming system for the engine 21, its internal details will be described only generally and by specific reference to later figures. Where these details are given it is to be understood, however, that they are merely typical of the environment in which the invention may be employed. The gaseous fuel system, as will become apparent, is adapted for use in a wide variety of engines and is not limited to reciprocating engines.

The engine 21 is described as being as automotive type, as this is a typical environment in which the engine 21 and invention may be employed. It should be apparent, however, to those skilled in the art that the invention is not limited in the application of the engines which it fuels.

The engine 21 is water cooled and is provided with a cooling jacket through which water is circulated by a coolant pump in a known manner. A heat exchanger such as a radiator 22 is provided at one end of the engine. A thermostatic flow system (not shown) is provided for circulating the coolant through the radiator 22 to maintain the temperature of the engine at a normal or desired operating condition.

Referring now specifically to the charge-forming and induction system for the engine 21, this includes a remotely positioned fuel storage tank 23 in which the gaseous fuel for the engine is stored under pressure. With many gaseous fuels and at least at some times, depending on the amount of fuel remaining in the tank 23, the fuel will actually be in a liquid form. The fuel can be butane, propane, a mixture of these gases, or any other known gaseous substances, as previously noted.

Fuel is delivered from the tank 23 through a conduit 24 to a filter 25. Downstream of the filter there is provided a solenoid-operated shut-off valve 26 that is adapted to close at times when the engine 21 is not running and to be opened during normal running conditions.

The shut-off valve 26 supplies fuel through a conduit 27 to a fuel vaporizer and pressure regulator, indicated generally by the reference numeral 28. This pressure regulator 28 will be described in more detail later by reference to FIG. 2.

As will be noted in the description of that figure, coolant is delivered to the vaporizer pressure regulator 28 from the engine cooling system for generating heat to assist in the vaporization of the gaseous fuel. A supply conduit 29 is connected appropriately into the cooling jacket of the engine 21 and supplies water to the vaporizer regulator 28. The water is then returned to the cooling jacket through a return conduit 31.

The pressure regulator 28 supplies the fuel, which has been vaporized, at a regulated pressure, which is something slightly less than atmospheric, to a charge former 32, the construction of which will be described later by particular reference to FIG. 3. The charge former 32, in turn, delivers a mixture of fuel and air to the engine through its induction system.

The system further includes an ECU 33 that operates on any desired principle so as to control the fuel-air ratio to maintain it stoichiometric at substantially all running conditions. By stoichiometric it is meant that the actual fuel-air ratio divided by the ideal fuel-air ratio for stoichiometric flow equals 1. This condition may be expressed by the following equation: $\lambda=F/F_c$. F represents the actual fuel-air ratio, and $F_c$ represents the stoichiometric fuel-air ratio. As will also be described, the system is designed so as to maintain this stoichiometric ratio of $\lambda=1$, regardless of the type of gaseous fuel employed.

Reference may be had to the aforenoted U.S. Pat. No. 5,337,722 for the specific control strategies which may be employed in conjunction with the invention. Since the invention deals primarily with the layout of certain components of the induction and charge-forming system, it should be understood that the invention can be utilized with a wide variety of types of charge formers and control systems and control strategies.

The ECU 33 receives the desired sensor signals to achieve this purpose. Specifically, the system is particularly adapted for using a feedback control system, as described in the aforenoted patent, wherein an oxygen sensor is supplied in the exhaust system so as to maintain the stoichiometric fuel-air ratio.

Figure 2:
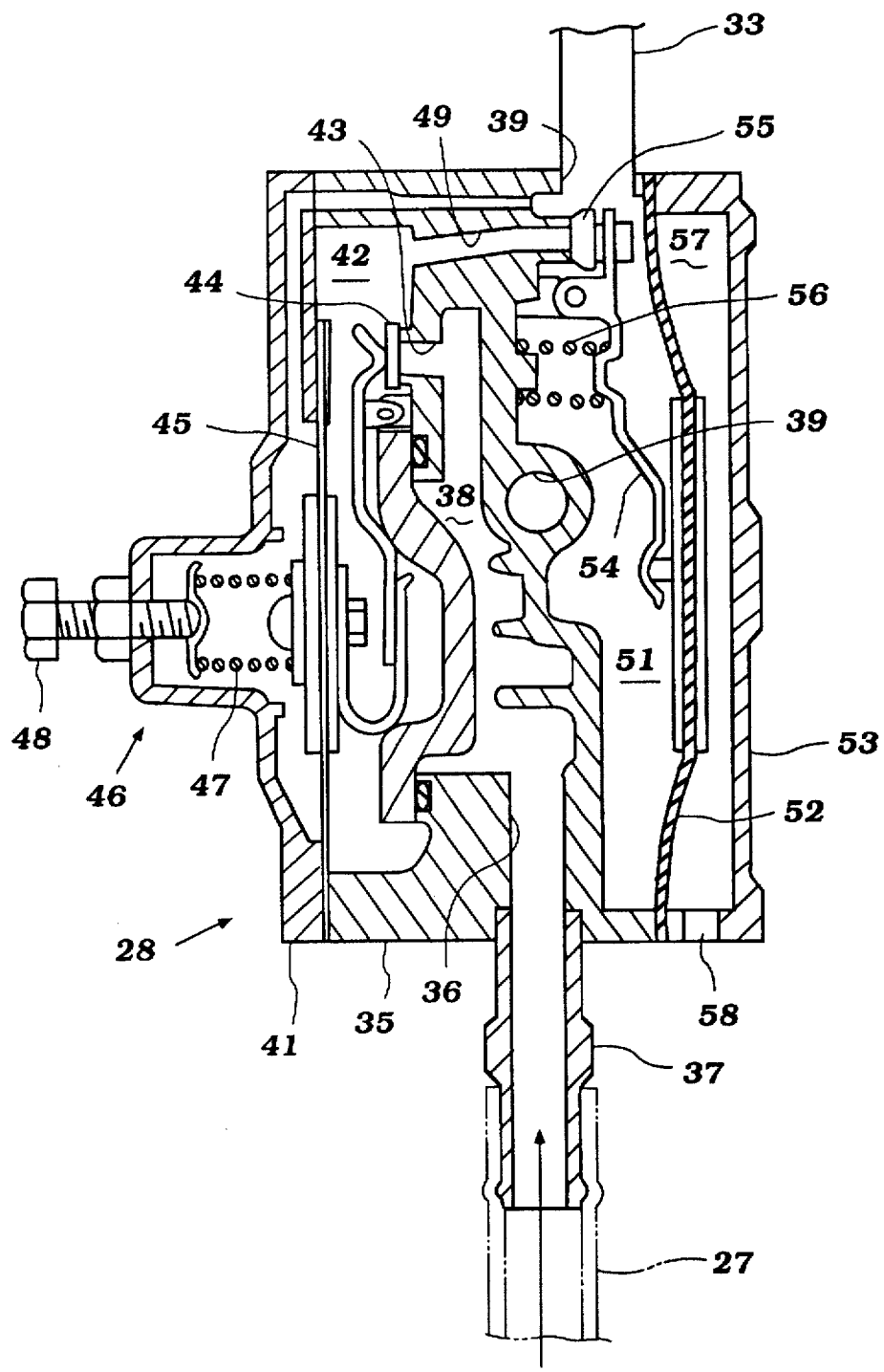
FIG. 2 is an enlarged cross-sectional view taken through the fuel vaporizer and pressure regulator.

The vaporizer pressure regulator will now be described by particular reference to FIG. 2. This vaporizer pressure regulator 28 is comprised of an outer housing that consists of a main housing unit 35 having an inlet passage 36 to which a fitting 37 is affixed so that pressurized gas may flow from the conduit 27 into a passage 38 formed therein. This passage is defined in part by a wall, through which a passage 39 extends. The coolant from the engine is circulated through this passage 39 so that the wall and regulator body 35 will be heated as will the fuel in the chamber 38. This ensures that vaporization of the fuel will occur.

A cover plate 41 is affixed to one side of the main housing piece 35 and forms a first regulating chamber 42. Fuel is admitted to the chamber 42 at the desired pressure by means of a passageway 43. The passageway 43 extends from the passage 38 to the chamber 42 and is valved by a valve element 44. The valve element 44 is carried by a diaphragm 45, which is held in closing relationship to the chamber 42 by the cover piece 41. A regulating arrangement, indicated generally by the reference numeral 46, is comprised of a spring 47 and adjusting screw 48 that act along with the diaphragm 45 on the valve element 44 so as to set the pressure at which it will open and close. Preferably, the regulator valve 46 is set so that the pressure in the chamber 42 will be about 0.3 kg/cm².

The regulating chamber 42 is connected by a conduit or internal passage 49 formed in the housing member 35 with a second regulating chamber 51. The chamber 51 is formed on the opposite side of the wall in which the heating-coolant passage 39 is formed. This chamber 51 is formed by a diaphragm 52 that is affixed across the chamber 51 by a cover piece 53. The diaphragm 51, in turn, acts on a pivoted lever 54 that controls a second regulating valve element 55. A coil compression spring 56 is provided to bias the lever 57 into engagement with the diaphragm 52 and to urge the diaphragm toward the position shown in FIG. 2.

An atmospheric air chamber 57 is formed between the diaphragm 52 and the cover piece 53. Atmospheric air pressure is maintained in the chamber 57 through an atmospheric air bleed 58. The diaphragm and spring 56 are designed so that the pressure regulated in the chamber 51 will be a pressure slightly less than atmospheric. This pressure will be determined by the preload and rate of the spring 56 and the diaphragm 52.

The chamber 51 is provided with a discharge opening 59 that communicates with the conduit 33 for delivering fuel to the charge former 32, as will now be described by reference to FIG. 3.

In order to understand the orientation of the charge former 32 and its relationship to the engine 21, a portion of the engine structure is shown in FIG. 3, and that portion will be described. As has been previously noted, however, it is to be understood that the construction of the engine 21 may be of any known type.

The engine 21 is comprised of a cylinder block 61 in which the cylinder bores 62 are formed. As will be apparent from the description of later embodiments, the engine is provided with either four in-line cylinder bores 62 or may be formed with angularly disposed cylinder bores, as in the V-type engine.

Pistons 63 reciprocate in the cylinder bores 62 and are connected to a crankshaft (not shown) for driving it in a known manner. A cylinder head assembly 64 is affixed to the cylinder block 61 in a known manner. This cylinder head assembly has recesses that cooperate with the cylinder bores 62 and pistons 63 to form the individual combustion chambers of the engine.

One side 65 of the cylinder head 64 is provided with one or more intake passages 66, which serve each combustion chamber through respective valve seats 67. Poppet-type intake valves 68 are supported in the cylinder head 64 in a known manner and control the opening and closing of these intake ports.

The poppet valves 68 are operated by an intake camshaft 69 that is journalled in the cylinder head 64 in a known manner and which is driven at one-half crankshaft speed, as is well known in this art. The intake camshaft 69 operates thimble tappets 71, which in turn operate the valve 68 in a well-known manner. As will be described by reference to later embodiments, the engine may be provided with two intake valves per cylinder.

The camshaft mechanism, including the intake camshaft 69 and the exhaust camshaft which is not shown, is contained within a cam chamber closed by a cam cover 72. The remaining components of the engine, which are not shown, include the exhaust valves and spark plugs, certain of which appear in the description of later embodiments.

The cooling jacket for the engine 21 appears in FIG. 3 and is shown partially and identified generally by the reference numeral 73. A temperature probe 74 is mounted in the cylinder block 61 and provides a temperature signal to the aforedescribed ECU 34.

Returning now to the induction system, this includes an air inlet device, indicated generally by the reference numeral 75, that is comprised of an outer housing having an atmospheric air intake port 76. An air filter element 77 is mounted in the air inlet device 75 and filters the air that is delivered to the carburetor 32.

The carburetor 32 is comprised of a main housing 78 which defines an intake passage 79. The carburetor 32 is of the air valve or constant depression type and includes a sliding throttle piston 81 which is supported within a control assembly 82 that is comprised of an outer housing 83. The sliding piston 81 is urged by means of a coil compression spring 84 toward a position so as to reduce the effective cross-sectional area of the flow passage 79 through the carburetor housing 78. The piston 81 defines a first chamber 85 which surrounds the piston 81 and is formed in part by the housing piece 83. This chamber 85 receives atmospheric air pressure through a ram tube 86 that extends into the inlet portion of the carburetor air passage 79.

A further passage 87 extends through the piston 81 into a second chamber 88 in which the spring 84 is retained. As is well known with this type of carburetor, the sliding piston 81 will move to a position dependent upon the pressure differences and the loading of the spring 84 so as to maintain a constant pressure drop there across or a substantially constant pressure in the downstream side of the induction passage 79.

The carburetor 32, and primarily its main body portion 78, is formed with a fuel-mixing chamber 89. The conduit 33 through which fuel is discharged from the vaporizer pressure regulator 38 communicates with this chamber 89 through a passageway in which a flow-controlling orifice 91 is provided. This mixing chamber 89 communicates with the air passage 79 through a metering jet 92. A metering rod 93 is carried by the sliding piston 81 and cooperates with the metering jet 92 so as to provide a flow area in proportion to the position of the piston 81 and the cross-sectional area of the flow passage, as is well known in this art.

An air bypass passage 94 extends from the upstream side of the air passage 79 to the mixing chamber 89 for delivering air to it. This passage 94 is provided with an adjustable metering jet 95 so as to provide a fixed metering adjustment for the amount of air introduced and mixed with the fuel before it passes through the metering jet 92.

A feedback control system is also provided for mixing additional air with the fuel in the mixing chamber 89. This feedback control is comprised of a bypass air passage 96 that extends from the air inlet device 75 downstream of the filter body 77 to the mixing chamber 89. A valve element 97 is actuated by a stepper motor 98 under the control of the ECU 34 so as to control the amount of air mixed with the fuel under the feedback control system, which may be of the type described in aforenoted U.S. Pat. No. 5,337,722. This feedback control system is designed so as to provide primarily a stoichiometric fuel-air ratio when the engine is running under most running conditions.

It should be noted that the carburetor 32 as thus far described has no throttle valve, unlike more conventional carburetors. That is, there is not provided a manually positioned throttle valve in the carburetor 32.

Rather, a throttle body, indicated generally by the reference numeral 99, is interposed between the carburetor 32 and an intake manifold, indicated generally by the reference numeral 101. This throttle body 99 has a main housing portion 102 that defines an air flow path 103. The air flow path 103 is, in this embodiment, coaxial with the carburetor path 79. A manually positioned throttle valve 104 is positioned in the passage 103 well downstream of the sliding piston 81 and the metering jet 92. The throttle valve 104 is mounted on the throttle valve shaft 105 and is connected to a manual operator in a suitable manner.

To provide idle speed control, there is provided an idle bypass passageway 106 that is formed in part in the carburetor body 78 and in the remaining part in the throttle body 102. This bypass passageway includes an inlet opening 107 downstream of the sliding piston 81 in the carburetor body 79 and communicating with its air flow passage 79. The passage 106 bypasses the throttle valve 104 and discharges into an opening 108 in the throttle body downstream of the throttle valve 104.

A flow-controlling valve 109 controls the amount of air flowing through the passage 106 and is operated by a stepper motor 111. The stepper motor 111 is also controlled by the ECU 34 so as to maintain the desired idle speed and idle stability.

The intake manifold 101 is provided with a plenum chamber 112 into which the throttle body 99 discharges. This intake manifold 101 has a plurality of runners 113, each of which extends from the plenum chamber 112 to a respective one of the cylinder head intake passages 66 for delivering the fuel-air charge thereto.

There is provided an intake manifold pressure sensor 114 that is positioned in the throttle body 99 downstream of the throttle valve 104. This pressure sensor 114 outputs a pressure signal to the ECU 34 which may be used so as to provide an indication of engine load and control such things such as spark timing, etc.

Finally, the engine 21 is provided with an EGR system for controlling $NO_x$ emissions. This exhaust gas recirculation system includes an EGR valve 115 that receives exhaust gases from the exhaust system of the engine through an EGR passage 116. This valve 115 is comprised of a valve body 117 and a pressure responsive valve element 118 that controls the flow from the passage 116 to an EGR passage 119 that communicates with the intake manifold 101, and specifically its plenum chamber 112. A suitable EGR control valve regulator 121 controls the pressure on the diaphragm actuator 122 of the EGR valve 115 so as to control its position in accordance with any desired control strategy.

It has been noted that the system operates so as to control the air bleed valve 97 and stepper motor 98 so as to maintain a stoichiometric fuel-air ratio under all or substantially all running conditions. It has also been noted that this control strategy may be of the type described in U.S. Pat. No. 5,337,722. Reference may be had to that application, but it will also be described by reference to FIG. 4 how the stepper motor 98 can adjust the fuel-air mixture so as to compensate for the type of fuel which is employed.

The curves shown in this figure represent those for fuels that are comprised of either propane, indicated by the solid triangle curve, or butane, indicated by the open circle curve. The remaining curves show mixtures of these two gases in the proportion shown in FIG. 3 wherein the percent of propane varies from zero (pure butane) to 100 percent (no butane). The stepper motor is designed so as to open and close the valve 97 in steps depending upon the sensed fuel-air ratio as determined by an oxygen sensor so as to increase the amount of fuel by closing the valve 97 or decrease the amount of fuel by opening the valve 97. Reference may be had to the aforenoted patent for suitable control strategies.

In the embodiment of the invention as thus far described, the throttle body containing the throttle valve 104 is separate from the body of the carburetor 82, and the throttle valve is well downstream of it and the metering passages in the carburetor 82. This protects the carburetor 82 from harmful deposits, particularly those caused from the exhaust gas recirculation and positive crankcase ventilation, if employed. FIG. 5 shows another embodiment of the invention, which is generally the same as the embodiment of FIGS. 1-4, but which employs a further refinement in the throttle body, indicated by the reference numeral 151 in this figure, which offers still further protection for the carburetor. Since the only difference between this embodiment and the previously described embodiment is the construction and operation of the throttle body 151, other components which are the same as those previously described have been identified by the same reference numerals and will not be described again. It should be noted that certain of these elements are also shown more schematically in this figure, but it is believed that those skilled in the art will readily understand the construction and operation of this embodiment.

It will be seen that in this embodiment the carburetor 32 still is of the down-draft type, and hence its flow passage 79 extends generally vertically. However, the throttle body assembly includes a throttle body housing 152 that has a curved section 153 that joins a vertically extending portion 154 and a horizontally extending portion 155. A throttle valve 156 is positioned in the horizontal portion 155 on a throttle valve shaft 157 that is manually operated in a known manner. The section 155 communicates with the plenum chamber 112 or the individual runner sections 113 of the intake manifold 101.

With this embodiment, therefore, the throttle valve 156 is positioned well downstream of and in the separate housing and assembly from the carburetor 32. In addition, the right-angle bend between the sections 154 and 155 provided by the curved portion 153 will offer a flow obstacle to the heavier foreign particles that might cause contamination, and further protection is achieved.

It should be noted that this embodiment also uses a positive crankcase ventilation system, and the PCV valve 158 communicates with the intake manifold 101 downstream of the throttle valves 156 so as to provide further protection against contamination.

In the embodiments as thus far described, the carburetors 32 have been of the down draft type. However, the hood line may be maintained in an even lower arrangement by providing a side draft type of carburetor, and FIGS. 6 and 7 show such an embodiment. Again, the components are substantially the same as those previously described, except for their orientation. For that reason, further description of the components is not believed to be necessary, and where the components are the same or substantially the same as those previously described, they have been identified by the same reference numerals and will not be described again.

In this embodiment, however, it should be noted that the four-valve construction, including the two intake valves per cylinder, is clearly illustrated. This figure also shows the combustion chamber recesses, indicated by the reference numeral 201, and the exhaust passages 202. Further, the centrally positioned spark plugs 203 appear in this figure. Also shown are the exhaust valves, which are indicated by the reference numeral 204. In all other regards, this embodiment is the same as FIG. 5, but differs only in the orientation of the intake passage 79 of the carburetor 32. Thus, this embodiment has the advantages of the embodiment of FIG. 5, and also provides a lower good line.

FIGS. 8 and 9 show another embodiment of the invention which is similar to the embodiment of FIGS. 5 and that of FIGS. 6 and 7. This embodiment differs from those embodiments in that the carburetor 32 is of the down draft type, rather than of the side draft type, as shown in the embodiments of these earlier figures. Because this is the only difference, those components which are the same or substantially the same except for their orientation have been identified by the same reference numerals and will not be described again.

All of the embodiments thus far described have illustrated in-line-type engines. This invention also can be employed with V-type engines and, in fact, has certain additional advantages when utilized with a V-type engine. FIGS. 10–12 show such an embodiment. Except for the fact that the engine has cylinder banks, indicated generally by the reference numerals 251 and 252, that are disposed at an angle to each other and define a valley 253 therebetween, each bank of cylinders 251 and 252 is the same as an in-line engine. However, the cylinder bank 251 is reversed relative to the cylinder bank 252 so that the induction systems are disposed in the valley 253. Because this is the only difference with the basic engine, the components therefor have been identified by the same reference numerals and will not be described again, except insofar as is necessary to describe this embodiment of the invention.

In the particular embodiment shown, each cylinder bank has its own respective intake manifold 101, and these manifolds are joined with a T-type throttle body, indicated generally by the reference numeral 254, which extends horizontally and which is disposed in the valley 253. Short runner sections 255 in which throttle valves 256 are provided for controlling the air flow to each intake manifold 101. These branch sections 255 are at curved angles, such as the angle 153 to a straight section 257, which is served by the carburetor 32. In this embodiment the carburetor 32 is of the side draft type, and its sliding piston 81 is disposed horizontally. As a result, a low hood line is maintained, and by placing the carburetor out of the valley area, the engine is easier to service and still maintains all of the advantages of the embodiments previously described.

It should be readily apparent from the foregoing description that the described constructions are extremely effective in providing compact engines and engines wherein the charge former is protected from deposits because it does not employ an integral throttle valve. Rather, the throttle valve is positioned well downstream of the charge former so as to protect the charge former. Of course, the foregoing description is that of preferred embodiments of the invention, and various changes and modifications may be made without departing from the spirit and scope of the invention as defined by the appended claims.

I claim:

1. A charge-forming system for a gaseous fueled internal combustion engine provided with a pair of angularly disposed cylinder banks, each having at least one intake port disposed adjacent a valley formed between said cylinder banks comprised of a source of gaseous fuel stored under pressure, a charge former having an air passage through which atmospheric air passes, fuel metering means in said charge former for receiving fuel from said gaseous fuel source, metering the fuel and mixing the fuel with the air flowing through said air passage, a throttle body separate from said charge former and in the flow path downstream of the point where fuel is mixed with the air in said charge former for receiving the air-fuel charge and delivering it to the intake ports of said engine, and throttle valve means in said throttle body for controlling the flow therethrough, said throttle body being positioned in said valley between said cylinder bank, said throttle body having a pair of throttle valves, each serving the intake port of the respective cylinder bank, said charge former being disposed at one end of and outside of said valley.

2. A charge-forming system as defined in claim 1, further including a vaporizer pressure regulator for regulating the pressure of the gaseous fuel delivered from the source to the charge former.

3. A charge-forming system as defined in claim 2, wherein the charge former includes a mixing chamber for receiving air in regulated amounts and mixing it with the fuel supplied by the source prior to introduction into the air passage of the charge former.

4. A charge-forming system as defined in claim 3, further including an idle discharge passageway extending across the throttle valve for controlling the idle air flow to the engine independently of the position of the throttle valve.

5. A charge-forming system as defined in claim 4, wherein the inlet to the idle bypass passage is formed in the charge former and the outlet is formed downstream of the throttle valve.

6. A charge-forming system as defined in claim 1, wherein the air passage of the charge former is disposed at an angle to the portion of the throttle body in which the throttle valve is positioned.

7. A charge-forming system as defined in claim 6, wherein the angle comprises a right angle.

8. A charge-forming system as defined in claim 7, further including a vaporizer pressure regulator for regulating the pressure of the gaseous fuel delivered from the source to the charge former.

9. A charge-forming system as defined in claim 8, wherein the charge former includes a mixing chamber for receiving air in regulated amounts and mixing it with the fuel supplied by the source prior to introduction into the air passage of the charge former.

10. A charge-forming system as defined in claim 9, further including an idle discharge passageway extending across the throttle valve for controlling the idle air flow to the engine independently of the position of the throttle valve.

11. A charge-forming system as defined in claim 10, wherein the inlet to the idle bypass passage is formed in the charge former and the outlet is formed downstream of the throttle valve.

12. A charge-forming system as defined in claim 1, wherein the throttle body has a T-configuration, with the long leg being connected directly to the charge former and the throttle valves being positioned in respective branches of the short leg.

13. A charge-forming system as defined in claim 12, wherein the charge former is disposed at one end of the engine.

* * * * *